(12) United States Patent
Tomlinson et al.

(10) Patent No.: US 11,848,459 B2
(45) Date of Patent: Dec. 19, 2023

(54) BARRIER SEAL ASSEMBLIES FOR SEALING VEHICLE ELECTRICAL HOUSINGS

(71) Applicant: FORD GLOBAL TECHNOLOGIES, LLC, Dearborn, MI (US)

(72) Inventors: Samuel Jeffrey Tomlinson, Farmington Hills, MI (US); Thomas Edward Smith, Livonia, MI (US); Christopher William Coyne, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 873 days.

(21) Appl. No.: 16/285,648

(22) Filed: Feb. 26, 2019

(65) Prior Publication Data

US 2020/0274112 A1 Aug. 27, 2020

(51) Int. Cl.
*H01M 50/249* (2021.01)
*H01M 50/26* (2021.01)
(Continued)

(52) U.S. Cl.
CPC ............ *H01M 50/26* (2021.01); *B60L 50/64* (2019.02); *F16J 15/127* (2013.01); *H01M 50/193* (2021.01); *H01M 50/249* (2021.01)

(58) Field of Classification Search
CPC ......... H01M 10/0525; H01M 2220/20; H01M 2/08; H01M 2/0275; H01M 2/06; H01M 2/30; H01M 2/1077; H01M 10/613; H01M 2/18; H01M 2/206; H01M 10/052; H01M 2/0217; H01M 2/1094; H01M 10/0413; H01M 10/625; H01M 2/027; H01M 2/0277; H01M 2/0285; H01M 2/345; H01M 2/34; H01M 10/425; H01M 2/024; H01M 10/0587; H01M 10/4257; H01M 2/021; H01M 2/263; H01M 2/266; H01M 2/26; H01M 2/305; H01M 2/0287; H01M 2/24; H01M 10/0431; H01M 2/1022; H01M 10/0436; H01M 2/12; H01M 2/22;
(Continued)

(56) References Cited

U.S. PATENT DOCUMENTS 3,836,398 A * 9/1974 Garcin ................ H01M 12/065
429/406
4,867,461 A * 9/1989 Shimmell .............. F16J 15/061
277/593
(Continued)

FOREIGN PATENT DOCUMENTS

WO WO 2007132993 * 11/2007 .............. B60L 50/64
WO WO-2007132993 A1 * 11/2007 .............. B60L 50/64

*Primary Examiner* — Kaity V Chandler
(74) *Attorney, Agent, or Firm* — David B. Kelley; Carlson, Gaskey & Olds, P.C.

(57) ABSTRACT

This disclosure details exemplary barrier seal assemblies for sealing vehicle electrical housings. The vehicle electrical housings may include any electrical housing utilized within a vehicle, including but not limited to battery pack housings and electrical connector assemblies. An exemplary barrier seal assembly may include a primary seal, a barrier seal, and a carrier that extends between the primary seal and the barrier seal. The barrier seal assembly is configured to reduce the ingress of corrosion inducing substances into an interior of vehicle electrical housings.

20 Claims, 6 Drawing Sheets

Section A-A

(51) Int. Cl.
  *H01M 50/193* (2021.01)
  *H01M 50/24* (2021.01)
  *B60L 50/64* (2019.01)
  *F16J 15/12* (2006.01)

(58) Field of Classification Search
  CPC ............ H01M 2/0212; H01M 2/0237; H01M 2/0222; H01M 2/1055; H01M 2220/30; H01M 2/0262; H01M 2/04; H01M 10/647; H01M 2/1061; H01M 2/022; H01M 2/1016; H01M 2/1072; H01M 10/0585; H01M 10/6557; H01M 6/12; H01M 10/6556; H01M 10/48; H01M 2/0413; H01M 2/043; H01M 2/1241; H01M 2/20; H01M 2004/027; H01M 2/0257; H01M 2/065; H01M 2200/20; H01M 10/654; H01M 2004/028; H01M 4/0404; H01M 10/345; H01M 10/482; H01M 2/1653; B60L 50/64; B60L 2220/44; B60L 15/20; B60L 2240/36; B60L 50/66; B60L 58/21; B60L 2210/40; B60L 2220/42; B60L 2220/46; B60L 2240/421; B60L 2240/545; B60L 3/0046; B60L 50/16; B60L 50/51; B60L 58/18; B60L 58/26; B60L 1/003; B60L 15/2036; B60L 15/2045; B60L 2200/26; B60L 2200/36; F16J 15/022; F16J 15/127; F16J 15/027; F16J 15/061; F16J 15/104; F16J 15/122; F16J 15/3264; F16J 13/22; F16J 13/24; F16J 15/065; F16J 15/067; F16J 15/102; F16J 15/106; F16J 15/108; F16J 15/123

See application file for complete search history.

(56) References Cited

U.S. PATENT DOCUMENTS

| | | | |
|---|---|---|---|
| 5,364,109 A * | 11/1994 | Sihon | F02F 7/006 |
| | | | 277/592 |
| 6,354,599 B1 * | 3/2002 | Inamura | F16J 15/104 |
| | | | 277/591 |
| 6,609,717 B2 | 8/2003 | Hinson | |
| 7,070,187 B2 | 7/2006 | Boeve | |
| 8,124,268 B2 | 2/2012 | Hock et al. | |
| 8,864,139 B2 | 10/2014 | Greca et al. | |
| 9,269,967 B2 | 2/2016 | Masaka et al. | |
| 2005/0269788 A1 * | 12/2005 | Grunfeld | F02F 11/002 |
| | | | 277/592 |
| 2013/0161105 A1 | 6/2013 | Maguire et al. | |
| 2018/0047959 A1 | 2/2018 | Kruger | |
| 2018/0361876 A1 * | 12/2018 | Ruech | B60L 50/64 |
| 2019/0252094 A1 * | 8/2019 | Wienziers | B60L 53/302 |

* cited by examiner

BARRIER SEAL ASSEMBLIES FOR SEALING VEHICLE ELECTRICAL HOUSINGS

TECHNICAL FIELD

This disclosure relates to seal assemblies, and more particularly to barrier seal assemblies that are configured for reducing the ingress of corrosion inducing substances into the interiors of vehicle electrical housings.

BACKGROUND

Modern day vehicles are equipped with a plurality of electrical housings that support a variety of electrical functions of the vehicles. One example of such an electrical housing is a high voltage battery pack for powering an electric machine and other electrical loads within an electrified vehicle (e.g., a hybrid electric vehicle (HEV), plug-in hybrid electric vehicle (PHEV), battery electric vehicle (BEV), etc.). A housing of the battery pack typically encloses a plurality of battery internal components including, but not limited to, battery arrays and battery electronic components. Depending on its mounting location on the vehicle, the battery pack may be susceptible to road splash, road salts, and other corrosion inducing substances picked up from the exterior environment.

SUMMARY

A vehicle electrical housing according to an exemplary aspect of the present disclosure includes, among other things, a first housing section, a second housing section and a barrier seal assembly positioned between the first housing section and the second housing section and configured to inhibit intrusion of corrosion inducing substances into an interior of the vehicle electrical housing. The barrier seal assembly includes a primary seal, a barrier seal, and a carrier that extends between the primary seal and the barrier seal.

In a further non-limiting embodiment of the foregoing vehicle electrical housing, the vehicle electrical housing is part of a high voltage traction battery pack.

In a further non-limiting embodiment of either of the foregoing vehicle electrical housings, the vehicle electrical housing is part of an electrical connector assembly.

In a further non-limiting embodiment of any of the foregoing vehicle electrical housings, a battery internal component is housed within the interior of the vehicle electrical housing.

In a further non-limiting embodiment of any of the foregoing vehicle electrical housings, the battery internal component includes a battery array, a battery electronic component, or both.

In a further non-limiting embodiment of any of the foregoing vehicle electrical housings, the barrier seal assembly is positioned within a sealing joint between the first housing section and the second housing section.

In a further non-limiting embodiment of any of the foregoing vehicle electrical housings, the primary seal is located on an inboard side of the vehicle electrical housing and the barrier seal is located on an outboard side of the vehicle electrical housing.

In a further non-limiting embodiment of any of the foregoing vehicle electrical housings, the primary seal is a press-in-place gasket seal and the barrier seal is an axially compressible seal.

In a further non-limiting embodiment of any of the foregoing vehicle electrical housings, the primary seal is a press-in-place gasket seal and the barrier seal is an radially compressible seal.

In a further non-limiting embodiment of any of the foregoing vehicle electrical housings, the primary seal is an axially compressible seal and the barrier seal is a radially compressible seal.

In a further non-limiting embodiment of any of the foregoing vehicle electrical housings, the carrier is a metal carrier, an elastomeric carrier, or a composite carrier.

In a further non-limiting embodiment of any of the foregoing vehicle electrical housings, the carrier includes an opening, and a fastener is received through the opening.

In a further non-limiting embodiment of any of the foregoing vehicle electrical housings, a compression limiter circumscribes the opening of the carrier.

In a further non-limiting embodiment of any of the foregoing vehicle electrical housings, the barrier seal assembly includes a fastener seal carried by a first carrier portion of the carrier that is located between the primary seal and the barrier seal.

In a further non-limiting embodiment of any of the foregoing vehicle electrical housings, the barrier seal, the primary seal, and the carrier establish a monolithic part made of a common elastomeric material.

A vehicle according to another exemplary aspect of the present disclosure includes, among other things, an electrical housing including a first housing section having a first mating surface, a second housing section having a second mating surface, a sealing joint established between the first mating surface and the second mating surface, and a barrier seal assembly positioned within the sealing joint and comprising a primary seal, a barrier seal, and carrier connected to both the primary seal and the barrier seal.

In a further non-limiting embodiment of the foregoing vehicle, the electrical housing is part of a high voltage traction battery pack.

In a further non-limiting embodiment of either of the foregoing vehicles, the electrical housing is part of an electrical connector assembly.

In a further non-limiting embodiment of any of the foregoing vehicles, the primary seal is located on an inboard side of the sealing joint and the barrier seal is located on an outboard side of the sealing joint.

In a further non-limiting embodiment of any of the foregoing vehicles, at least one fastener is received through openings formed in each of the first housing section, the carrier, and the second housing section.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary barrier seal assemblies for sealing vehicle electrical housings. The vehicle electrical housings may include any electrical housing utilized within a vehicle, including but not limited to battery pack housings and electrical connector assemblies. An exemplary barrier seal assembly may include a primary seal, a barrier seal, and a carrier that extends between the primary seal and the barrier seal. The barrier seal assembly is configured to reduce the ingress of corrosion inducing substances into an interior of vehicle electrical housings. These and other features are discussed in greater detail in the following paragraphs of this detailed description.

Figure 1:
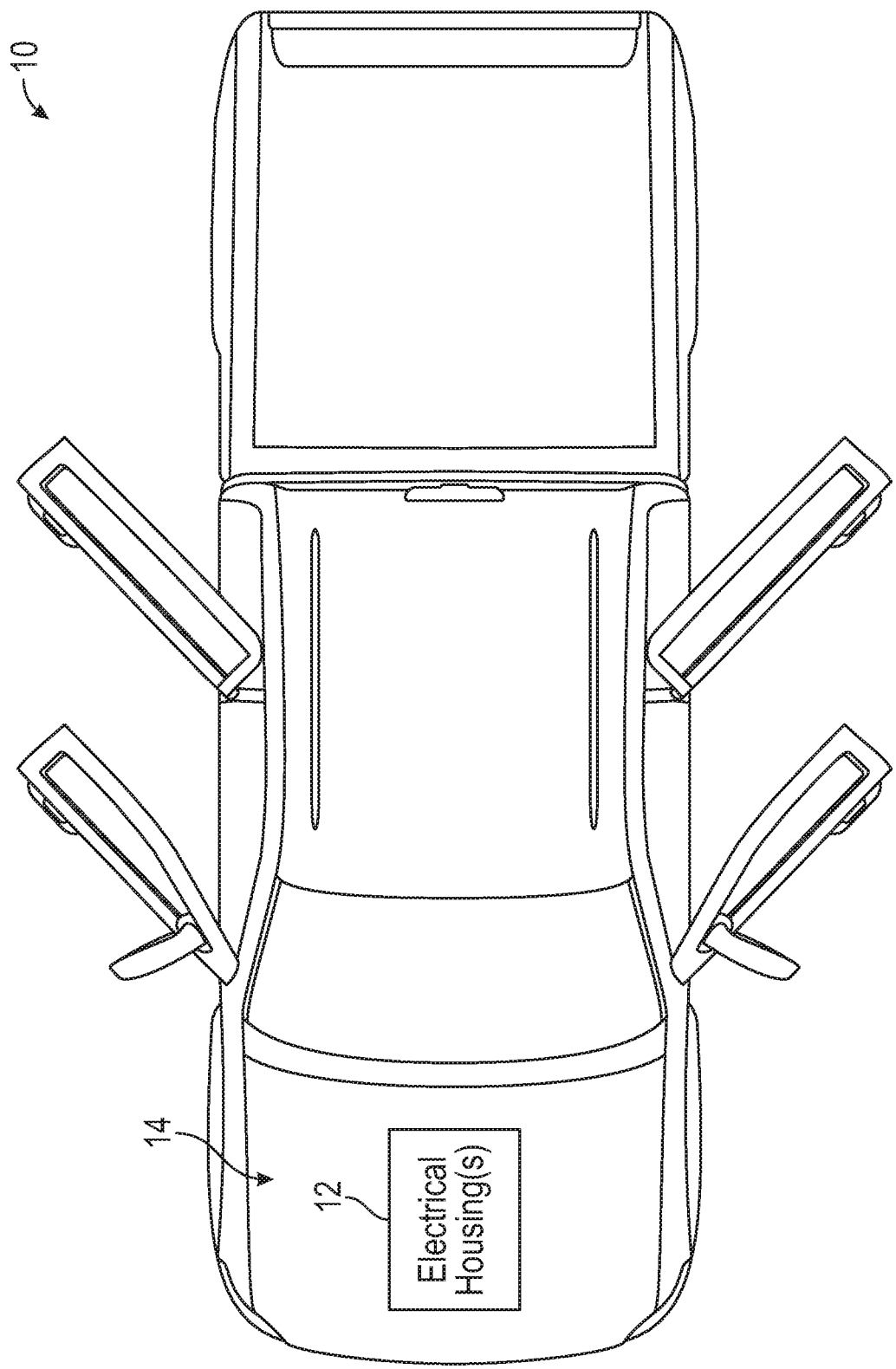
FIG. 1 schematically illustrates a vehicle equipped with an electrical housing.

FIG. 1 schematically illustrates a vehicle 10. The vehicle 10 may be a car, a truck, a van, a sport utility vehicle, or any other type of vehicle. The vehicle 10 could also be a conventional internal combustion engine powered motor vehicle, a high voltage battery powered hybrid or electric vehicle, or an autonomous vehicle (i.e., a driverless vehicle).

The vehicle 10 may be equipped with one or more electrical housings 12. For simplicity, only one electrical housing 12 is depicted in FIG. 1. However, the vehicle 10 could include a plurality of electrical housings for supporting a multitude of electrical functions within the vehicle 10.

Although a specific component relationship is illustrated in the figures of this disclosure, the illustrations are not intended to limit this disclosure. The placement and orientation of the various components of the vehicle 10 are shown schematically and could vary within the scope of this disclosure. For example, although schematically depicted in FIG. 1 as being located within a front end assembly 14 of the vehicle 10, the electrical housing 12 could be mounted at any vehicle location, including vehicle underbody locations. In addition, the various figures accompanying this disclosure are not necessarily drawn to scale, and some features may be exaggerated or minimized to emphasize certain details of a particular component.

Depending on its mounting location, and in particular for underbody mounting locations, the electrical housing 12 may be susceptible to road splash, road salts, and other corrosion inducing substances that may be picked up from the exterior environment. Novel barrier seal assemblies for inhibiting the intrusion of these types of corrosion inducing substances into and through the sealing joints of the electrical housing 12 are therefore proposed in this disclosure.

Figure 2:
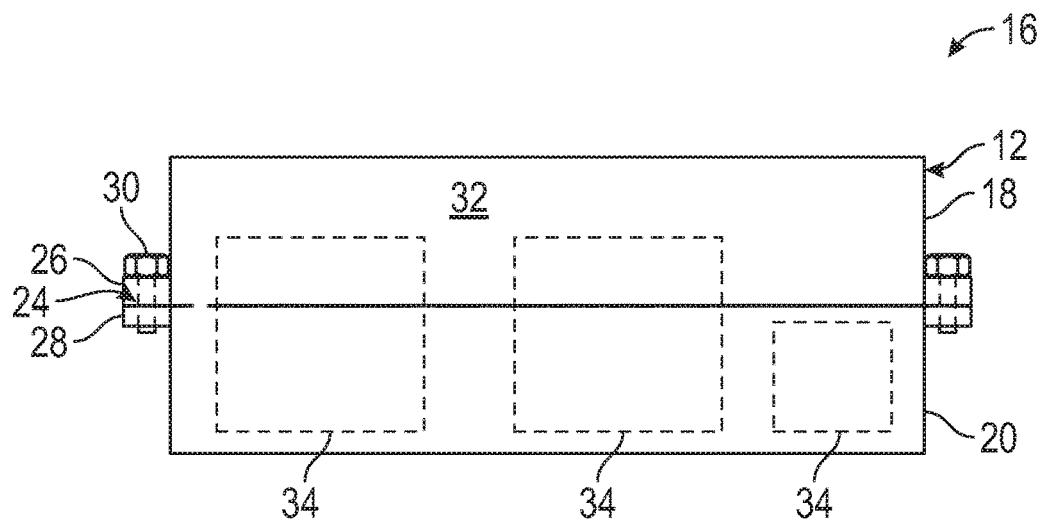
FIG. 2 schematically illustrates an exemplary vehicle electrical housing.
Figure 3:
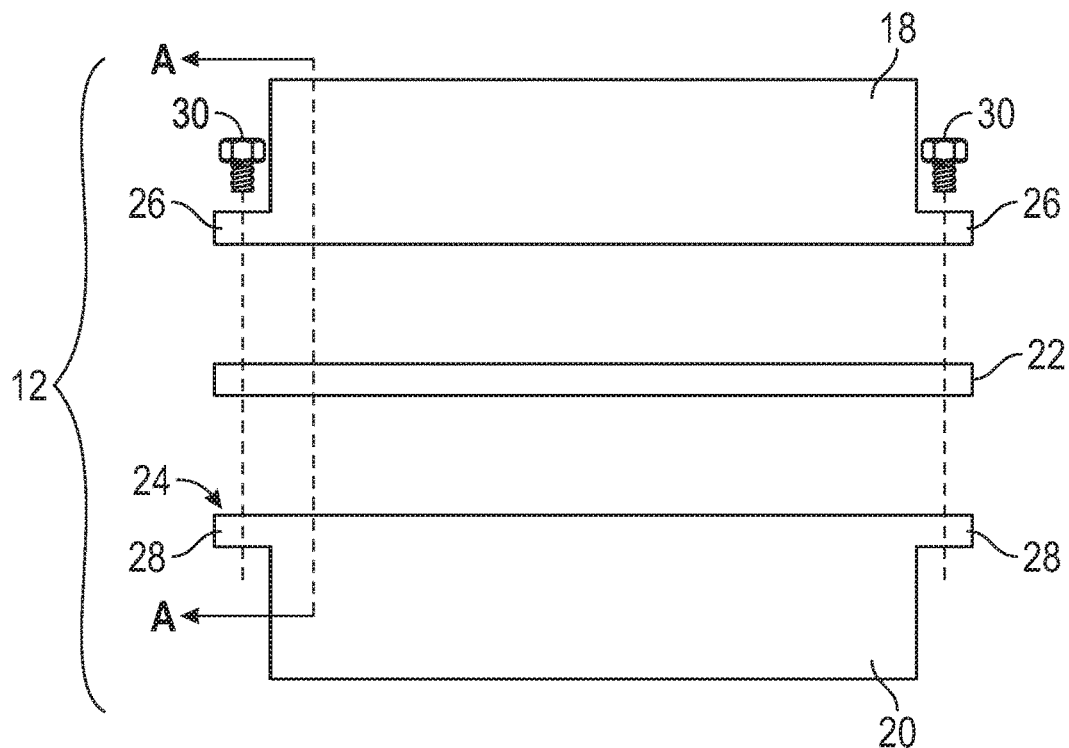
FIG. 3 is an exploded view of the vehicle electrical housing of FIG. 2.

FIGS. 2 and 3 illustrate an electrical housing 12 that may be employed within a vehicle, such as the vehicle 10 of FIG. 1. In an embodiment, electrical housing 12 is part of a high voltage traction battery pack 16 that is capable of providing power for propelling an electrified vehicle.

The electrical housing 12 may include a first housing section 18 (e.g., a cover), a second housing section 20 (e.g., a tray), and a barrier seal assembly 22 disposed between the first housing section 18 and the second housing section 20 and configured for sealing a sealing joint 24 of the electrical housing 12. In an embodiment, the sealing joint 24 is established between a first mounting flange 26 of the first housing section 18 and a second mounting flange 28 of the second housing section 20. One or more fasteners 30 (e.g. bolts, screws, etc.) may be inserted through openings formed in the first and second mounting flanges 26, 28 in order to secure the first housing section 18 and the second housing section 20 together.

The electrical housing 12 include an interior 32 for housing one or more battery internal components 34 of the battery pack 16. The battery internal components 34 may include battery arrays (i.e., groupings of battery cells) and/or various battery electronic components (e.g., control modules, wiring, etc.). The electrical housing 12 may include any size, shape, and configuration and is therefore not limited to the exact configuration shown in FIGS. 2-3.

FIGS. 4-10 illustrate various exemplary embodiments of the barrier seal assembly 22 described above. Any of the barrier seal assemblies shown in FIGS. 4-10 may be utilized for sealing the sealing joint 24 of the electrical housing 12 of the battery pack 16 of FIGS. 2-3, or for sealing any other vehicle electrical housing.

Figure 4:
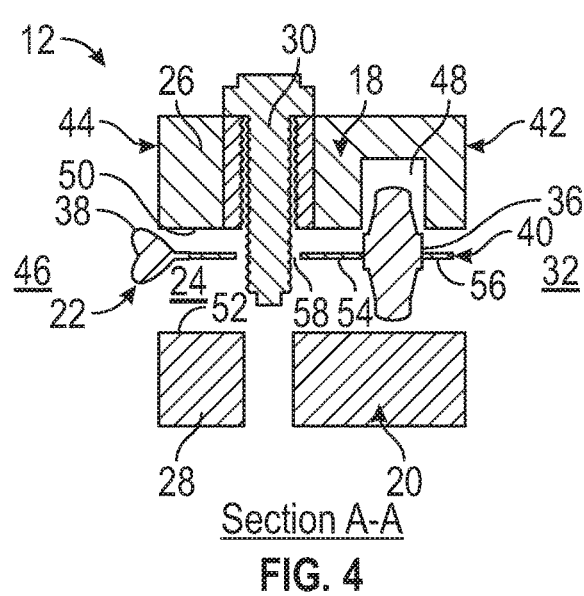
FIG. 4 is an exploded, cross-sectional view through section A-A of the vehicle electrical housing of FIG. 3. An exemplary barrier seal assembly is depicted.

Referring first to FIG. 4, the barrier seal assembly 22 may include a primary seal 36, a barrier seal 38, and a carrier 40 that connects between the primary seal 36 and the barrier seal 38. Once positioned at the sealing joint 24 of the electrical housing 12, the primary seal 36 is located on an inboard side 42 of the electrical housing 12 and the barrier seal 38 is located on an outboard side 44 of the electrical housing 12. In an embodiment, the inboard side 42 is closer to the interior 32 of the electrical housing 12, whereas the outboard side 44 is closer to an exterior environment 46 outside of the electrical housing 12. Together, the primary seal 36 and the barrier seal 38 provide sealing redundancy, thereby reducing the risk of corrosion inducing substances (e.g., moisture, salt, etc.) entering the interior 32 of the electrical housing 12 from the exterior environment 46 through the sealing joint 24.

In an embodiment, the primary seal 36 is a press-in-place (PIP) gasket seal. The primary seal 36 may be molded out of an elastomeric material, such as rubber, liquid silicone rubber, thermoplastic elastomer (TPE), or any other suitable elastomer. The primary seal 36 may be pressed into a groove 48 formed in either the first housing section 18, the second housing section 20, or both. In an embodiment, the groove 48 is formed in the first mounting flange 26 of the first housing section 18.

In another embodiment, the barrier seal 38 may be an axially compressible seal made from an elastomeric material. The elastomeric material of the barrier seal 38 may be the same material or a different material from the elastomeric material of the primary seal 36. The barrier seal 38 may be axially compressed between a first mating surface 50 of the first mounting flange 26 of the first housing section 18 and a second mating surface 52 of the second mounting flange 28 of the second housing section 20.

Figure 4A:
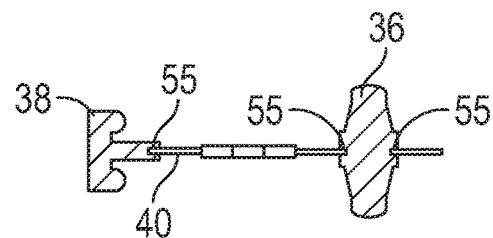
FIGS. 4A, 4B, and 4C illustrate exemplary mechanical attachment strategies for connecting seals and a carrier of a barrier seal assembly.
Figure 4B:
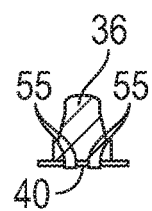
Figure 4C:
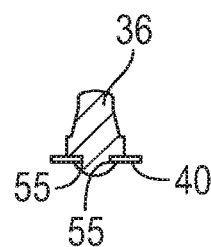

The carrier 40 of the barrier seal assembly 22 may be secured to both the primary seal 36 and the barrier seal 38 for connecting the primary seal 36 and the barrier seal 38 together to establish a monolithic seal structure of the barrier seal assembly 22. In an embodiment, the carrier 40 is mechanically attached to the primary seal 36 and the barrier seal 38. For example, the carrier 40 could be mechanically retained within notches 55 formed in both the primary seal 36 and the barrier seal 38 (see, e.g., FIG. 4A). Various other mechanical attachment strategies are also contemplated (see, e.g., FIGS. 4B and 4C).

In another embodiment, the carrier 40 is chemically bonded to the primary seal 36 and the barrier seal 38. For example, the primary seal 36 and/or barrier seal 38 may be over-molded onto the carrier 40 to create a chemical bond between the chemically compatible materials of these parts.

In an embodiment, the carrier 40 is made from a metallic material. In another embodiment, the carrier 40 is made from an elastomeric material. In yet another embodiment, the carrier 40 is made from a composite material (e.g., a metal that is overmolded with a plastic).

The carrier 40 may include a first carrier section 54 disposed between the primary seal 36 and the barrier seal 38 and a second carrier section 56 that extends from the primary seal 36 in a direction opposite from the barrier seal 38. The first carrier section 54 may include one or more openings 58 for accommodating the fasteners 30 of the electrical housing 12.

Figure 5:
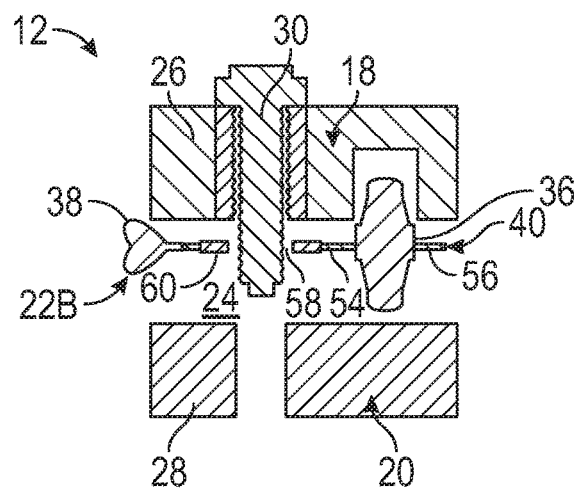
FIG. 5 is another exploded, cross-sectional view depicting another exemplary barrier seal assembly of a vehicle electrical housing.

FIG. 5 illustrates another exemplary barrier seal assembly 22B. The barrier seal assembly 22B is similar to the barrier seal assembly 22 of FIG. 4 and includes the primary seal 36, the barrier seal 38, and the carrier 40. However, in this embodiment, the barrier seal assembly 22B may further include a compression limiter 60. The compression limiter 60 may circumscribe the opening 58 formed in the first carrier section 54 of the carrier 40 and is configured to control the compressive forces generated during fixation of the fastener 30, thereby ensuring joint integrity across the sealing joint 24.

Figure 6:
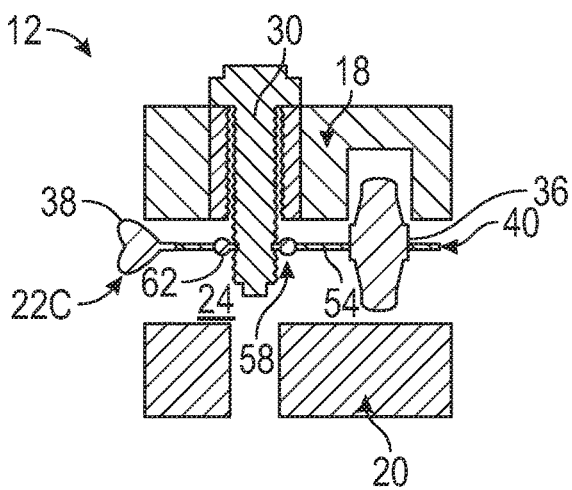
FIG. 6 is another exploded, cross-sectional view depicting another exemplary barrier seal assembly of a vehicle electrical housing.

FIG. 6 illustrates another exemplary barrier seal assembly 22C. The barrier seal assembly 22C is similar to the barrier seal assembly 22 of FIG. 4 and includes the primary seal 36, the barrier seal 38, and the carrier 40. However, in this embodiment, the barrier seal assembly 22C may further include a fastener seal 62. In an embodiment, the fastener seal 62 is an elastomeric seal. The fastener seal 62 may be received within an opening 58 of the first carrier section 54 or may itself establish the opening 58 of the first carrier section 54. The fastener seal 62 is configured to inhibit the intrusion of corrosion inducing substances from entering the sealing joint 24 around the fastener 30.

Figure 7:
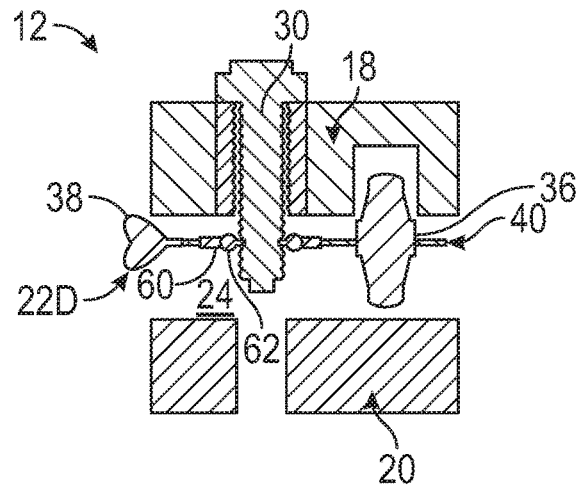
FIG. 7 is yet another exploded, cross-sectional view depicting another exemplary barrier seal assembly of a vehicle electrical housing.

FIG. 7 illustrates yet another exemplary barrier seal assembly 22D. The barrier seal assembly 22D is similar to the barrier seal assembly 22C of FIG. 6 and includes the primary seal 36, the barrier seal 38, the carrier 40, and the fastener seal 62. However, in this embodiment, the barrier seal assembly 22D may further include a compression limiter 60. The compression limiter 60 may circumscribe the fastener seal 62 and is configured to control the compressive forces generated during fixation of the fastener 30, thereby ensuring joint integrity across the sealing joint 24.

Figure 8:
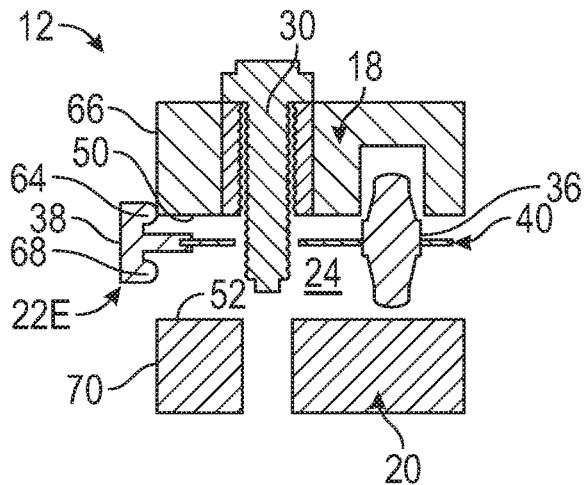
FIG. 8 is yet another exploded, cross-sectional view depicting another exemplary barrier seal assembly of a vehicle electrical housing.

FIG. 8 illustrates yet another exemplary barrier seal assembly 22E. The barrier seal assembly 22E is similar to the barrier seal assembly 22 of FIG. 4 and includes the primary seal 36, the barrier seal 38, and a carrier 40. However, in this embodiment, the barrier seal 38 is a radially compressible seal rather than an axially compressible seal. The barrier seal 38 may include a first sealing surface 64 for sealing against an outer surface 66 of the first housing section 18 and a second sealing surface 68 for sealing against an outer surface 70 of the second housing section 20. Thus, in this embodiment, at least a portion of the barrier seal 38 is not sandwiched between the first and second mating surfaces 50, 52 of the first and second housing sections 18, 20.

Figure 9:
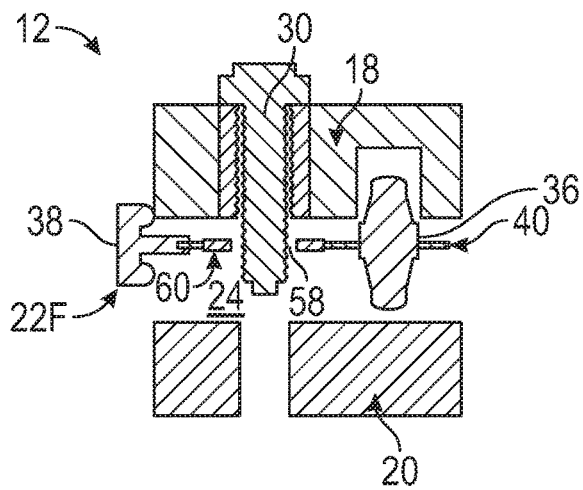
FIG. 9 is yet another exploded, cross-sectional view depicting another exemplary barrier seal assembly of a vehicle electrical housing.

FIG. 9 illustrates yet another exemplary barrier seal assembly 22F. The barrier seal assembly 22F is similar to the barrier seal assembly 22E of FIG. 8 and includes the primary seal 36, the radially compressible barrier seal 38, and the carrier 40. However, in this embodiment, the barrier seal assembly 22F may further include a compression limiter 60. The compression limiter 60 may circumscribe an opening 58 formed in the carrier 40 and is configured to control the compressive forces generated during fixation of the fastener 30, thereby ensuring joint integrity across the sealing joint 24.

Figure 10:
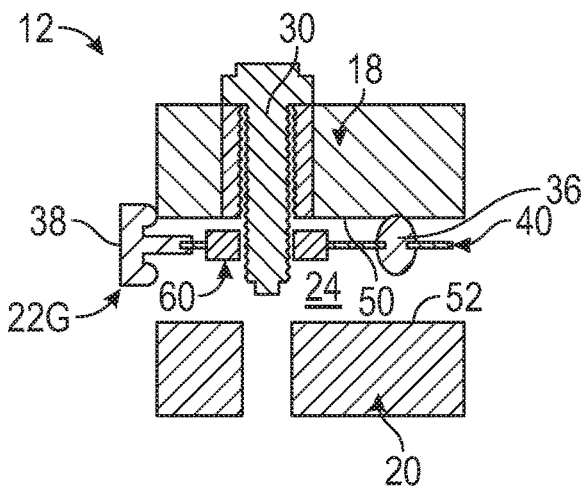
FIG. 10 is yet another exploded, cross-sectional view depicting another exemplary barrier seal assembly of a vehicle electrical housing.

FIG. 10 illustrates yet another exemplary barrier seal assembly 22G. The barrier seal assembly 22G is similar to the barrier seal assembly 22F of FIG. 9. However, in this embodiment, the primary seal 36 is an axially compressible seal that may be sandwiched between the first and second mating surfaces 50, 52 of the first and second housing sections 18, 20 rather than being pressed into a groove of the first or second housing section 18, 20.

Figure 11:
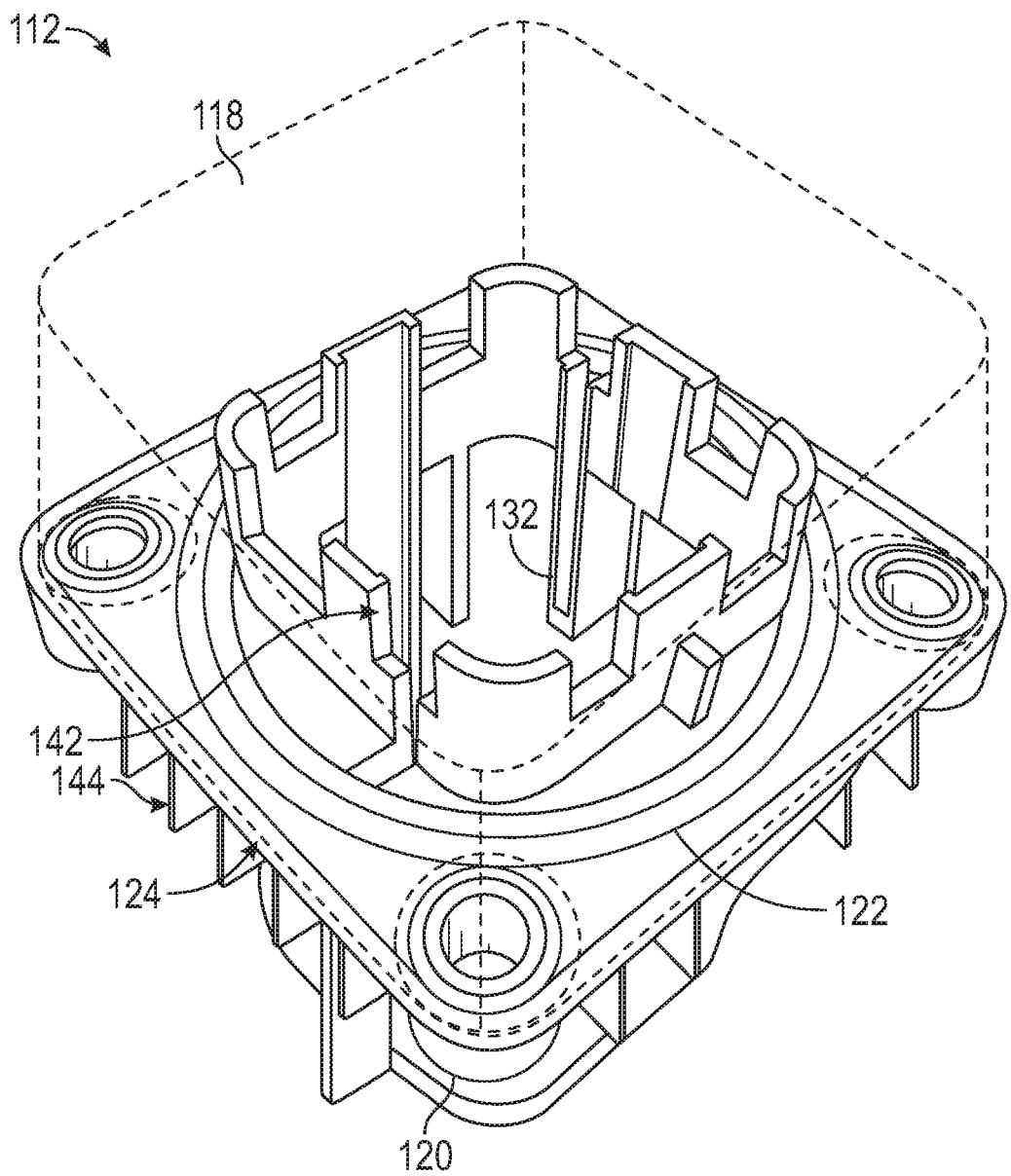
FIG. 11 illustrates another exemplary vehicle electrical housing.

The barrier seal assemblies described above are detailed in the context of a high voltage traction battery pack for an electrified vehicle. However, this disclosure is not limited to barrier seal assemblies for use within battery packs. Other vehicle electrical housings could also benefit from the barrier seal assembly designs described above. In this regard, another exemplary electrical housing 112 is shown in FIG. 11. In this embodiment, the electrical housing 112 is an electrical connector assembly for supporting electrical connections within a vehicle.

The electrical housing 112 of FIG. 11 may include a first housing section 118 (shown in phantom), a second housing section 120, and a barrier seal assembly 122 disposed between the first housing section 118 and the second housing section 120. The barrier seal assembly 122 is configured for sealing a sealing joint 124 of the electrical housing 112. The first housing section 118 and the second housing section 120 may be secured together using one or more fasteners (not shown in this embodiment).

Figure 12:
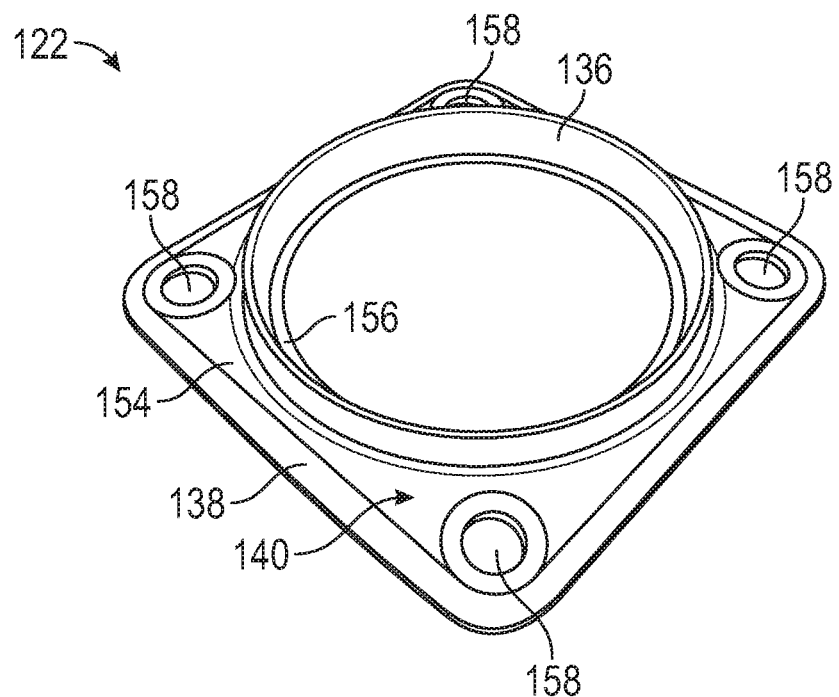
FIG. 12 is a top view of an exemplary barrier seal assembly of the vehicle electrical housing of FIG. 11.
Figure 13:
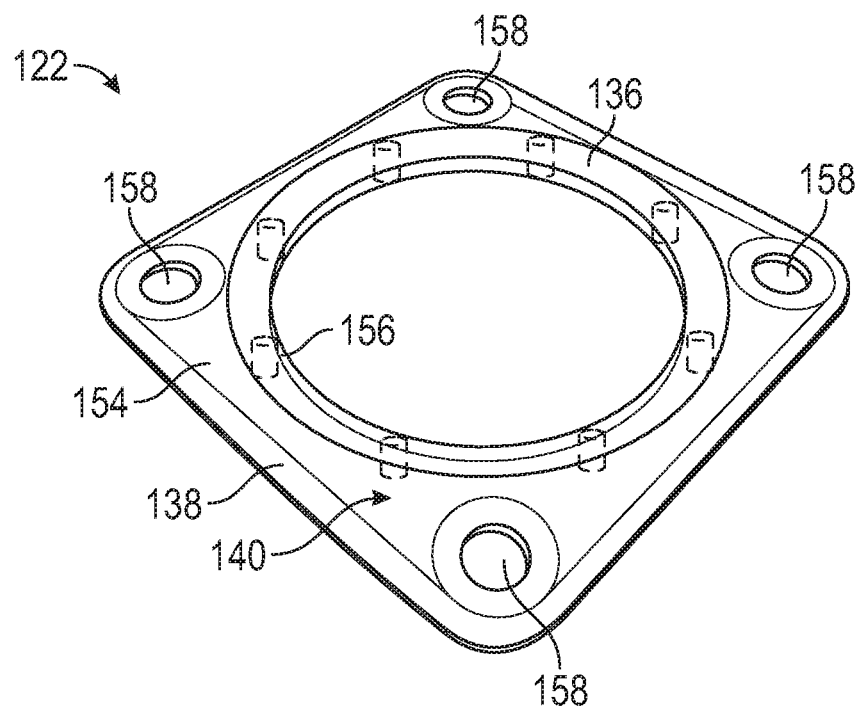
FIG. 13 is a bottom view of the exemplary barrier seal assembly of FIG. 12.

Referring now to FIGS. 11-13, the barrier seal assembly 122 may include may include a primary seal 136, a barrier seal 138, and a carrier 140 that connects between the primary seal 136 and the barrier seal 138. Once positioned at the sealing joint 124 of the electrical housing 112, the primary seal 136 is located on an inboard side 142 of the electrical housing 112 and the barrier seal 138 is located on an outboard side 144 of the electrical housing 12. Together, the primary seal 136 and the barrier seal 138 provide sealing redundancy, thereby reducing the risk of corrosion inducing substances (e.g., moisture, salt, etc.) entering an interior 132 of the electrical housing 112 through the sealing joint 124.

In an embodiment, the primary seal 136, the barrier seal 138, and the carrier 140 are manufactured from a common elastomeric material in order to establish a single piece, monolithic seal having no mechanical attachments. In another embodiment, the primary seal 136 is a PIP gasket seal that may be pressed into a groove formed in either the first housing section 118 or the second housing section 120, and the barrier seal 138 is an axially compressible seal that may be axially compressed between mating surfaces of the first and second housing sections 118, 120.

The carrier 140 of the barrier seal assembly 22 may be integrally formed with both the primary seal 136 and the barrier seal 138. The carrier 140 may include a first carrier section 154 disposed between the primary seal 136 and the barrier seal 138 and a second carrier section 156 that extends from the primary seal 136 in a direction opposite from the barrier seal 138. The first carrier section 154 may include a plurality of openings 158 for accommodating fasteners of the electrical housing 112.

The exemplary barrier seal assemblies of this disclosure incorporate the use of both a primary seal and a barrier seal for providing sealing redundancy. The sealing redundancy significantly reduces the likelihood of corrosion inducing substances entering into vehicle electrical housings. The barrier seal assemblies described herein offer a drop-in solution for any axially compressed sealing joint.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle electrical housing, comprising:
   a first housing section;
   a second housing section; and
   a barrier seal assembly positioned between the first housing section and the second housing section and configured to inhibit intrusion of corrosion inducing substances into an interior of the vehicle electrical housing,
   wherein the barrier seal assembly includes a primary seal, a barrier seal, and a carrier that extends between the primary seal and the barrier seal,
   wherein a first carrier section of the carrier is connected to both the primary seal and the barrier seal.

2. The vehicle electrical housing as recited in claim 1, wherein the vehicle electrical housing is part of a high voltage traction battery pack or an electrical connector assembly.

3. The vehicle electrical housing as recited in claim 1, comprising a battery internal component housed within the interior of the vehicle electrical housing, wherein the battery internal component includes a battery array, a battery electronic component, or both.

4. The vehicle electrical housing as recited in claim 1, wherein the barrier seal assembly is positioned within a sealing joint between the first housing section and the second housing section.

5. The vehicle electrical housing as recited in claim 1, wherein the primary seal is located on an inboard side of the vehicle electrical housing and the barrier seal is located on an outboard side of the vehicle electrical housing, and further wherein the inboard side is closer to the interior of the vehicle electrical housing and the outboard side is closer to an exterior environment outside of the vehicle electrical housing.

6. The vehicle electrical housing as recited in claim 1, wherein the primary seal is a press-in-place gasket seal and the barrier seal is an axially compressible seal.

7. The vehicle electrical housing as recited in claim 1, wherein the primary seal is a press-in-place gasket seal and the barrier seal is a radially compressible seal.

8. The vehicle electrical housing as recited in claim 1, wherein the primary seal is an axially compressible seal and the barrier seal is a radially compressible seal.

9. The vehicle electrical housing as recited in claim 1, wherein the carrier is a metal carrier, an elastomeric carrier, or a composite carrier.

10. The vehicle electrical housing as recited in claim 1, wherein the carrier includes an opening, and a fastener is received through the opening.

11. The vehicle electrical housing as recited in claim 10, comprising a compression limiter that circumscribes the opening of the carrier.

12. The vehicle electrical housing as recited in claim 1, wherein the barrier seal assembly includes a fastener seal carried by the first carrier section.

13. The vehicle electrical housing as recited in claim 1, wherein the barrier seal, the primary seal, and the carrier establish a monolithic part made of a common elastomeric material.

14. The vehicle electrical housing as recited in claim 1, wherein the barrier seal is sized and shaped differently from the primary seal.

15. The vehicle electrical housing as recited in claim 1, wherein a first portion of the first carrier section is retained within a first notch of the primary seal and a second portion of the first carrier section is retained within a second notch of the barrier seal.

16. A vehicle, comprising:
   an electrical housing including:
      a first housing section having a first mating surface;
      a second housing section having a second mating surface;
      a sealing joint established between the first mating surface and the second mating surface; and
      a barrier seal assembly positioned within the sealing joint and comprising a primary seal, a barrier seal, and carrier connected to both the primary seal and the barrier seal.

17. The vehicle as recited in claim 16, wherein the electrical housing is part of a high voltage traction battery pack or an electrical connector assembly.

18. The vehicle as recited in claim 16, wherein the primary seal is located on an inboard side of the sealing joint and the barrier seal is located on an outboard side of the sealing joint.

19. The vehicle as recited in claim 16, comprising at least one fastener received through openings formed in each of the first housing section, the carrier, and the second housing section.

20. A vehicle electrical housing, comprising:
a first housing section including a first mounting flange;
a second housing section including a second mounting flange;
a barrier seal assembly positioned between the first mounting flange and the second mounting flange and configured to inhibit intrusion of corrosion inducing substances into an interior of the vehicle electrical housing,
wherein the barrier seal assembly includes a primary seal, a barrier seal, and a carrier extending between the primary seal and the barrier seal,
wherein a first carrier section of the carrier is connected to each the primary seal and the barrier seal,
wherein the barrier seal is sized and shaped differently from the primary seal,
wherein the barrier seal assembly includes a compression limiter or a fastener seal that circumscribes an opening formed in the first carrier section; and
a fastener received through the first mounting flange, the opening, and the second mounting flange.

* * * * *